US010999552B2

(12) United States Patent
Aoyama

(10) Patent No.: US 10,999,552 B2
(45) Date of Patent: May 4, 2021

(54) IMAGE CAPTURING APPARATUS, CONTROL METHOD THEREFOR, AND NON-TRANSITORY COMPUTER-READABLE STORAGE MEDIUM

(71) Applicant: CANON KABUSHIKI KAISHA, Tokyo (JP)

(72) Inventor: Satoshi Aoyama, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/673,163

(22) Filed: Nov. 4, 2019

(65) Prior Publication Data
US 2020/0145606 A1 May 7, 2020

(30) Foreign Application Priority Data
Nov. 5, 2018 (JP) .............................. JP2018-208365

(51) Int. Cl.
H04N 5/77 (2006.01)
G11B 31/00 (2006.01)
H04N 5/232 (2006.01)

(52) U.S. Cl.
CPC ............. H04N 5/77 (2013.01); G11B 31/006 (2013.01); H04N 5/23235 (2013.01)

(58) Field of Classification Search
CPC ........ H04N 5/77; H04N 5/23235; H04N 5/85; G11B 31/006; G11B 27/031; G11B 27/034; G11B 27/036; G11B 2220/2541; G11B 2220/2545
USPC ...................................................... 386/224
See application file for complete search history.

(56) References Cited

U.S. PATENT DOCUMENTS 5,543,925 A * 8/1996 Timmermans ..... G11B 27/3036
386/219
2005/0008327 A1* 1/2005 Shinkai ................ G11B 27/329
386/283

FOREIGN PATENT DOCUMENTS

| CN | 1067545 A | 12/1992 |
|---|---|---|
| CN | 1551212 A | 12/2004 |
| CN | 1586068 A | 2/2005 |
| CN | 101309417 A | 11/2008 |
| CN | 101365064 A | 2/2009 |

(Continued)

OTHER PUBLICATIONS

The above foreign patent documents were cited in a Feb. 20, 2021 Chinese Office Action, which is enclosed that issued in Chinese Patent Application No. 201911043116.2.

Primary Examiner — Thai Q Tran
Assistant Examiner — Jose M Mesa
(74) Attorney, Agent, or Firm — Cowan, Liebowitz & Latman, P.C.

(57) ABSTRACT

This invention provides an image capturing apparatus that has an image capturing portion and records captured image data into a recording medium, where the image capturing apparatus comprises an acquiring portion configured to acquire information indicating a standard of the recording medium from the recording medium, the standard being related to writing; and a control portion configured to, when at least two types of images are to be recorded as separate files from among images acquired from the image capturing portion, perform processing for recording into the recording medium in accordance with the information acquired by the acquiring portion and types of the two different types of images to be recorded.

8 Claims, 14 Drawing Sheets

(56) References Cited

FOREIGN PATENT DOCUMENTS

| | | |
|---|---|---|
| CN | 101867706 A | 10/2010 |
| CN | 103516987 A | 1/2014 |
| CN | 104423888 A | 3/2015 |
| JP | 2016-139924 A | 8/2016 |

* cited by examiner

FIG. 1A STATE OF MEDIA BEFORE RECORDING

FIG. 1B STATE OF MEDIA AFTER RECORDING

FIG. 1C STATE OF MEDIA AFTER DELETING MOVIE IMAGES

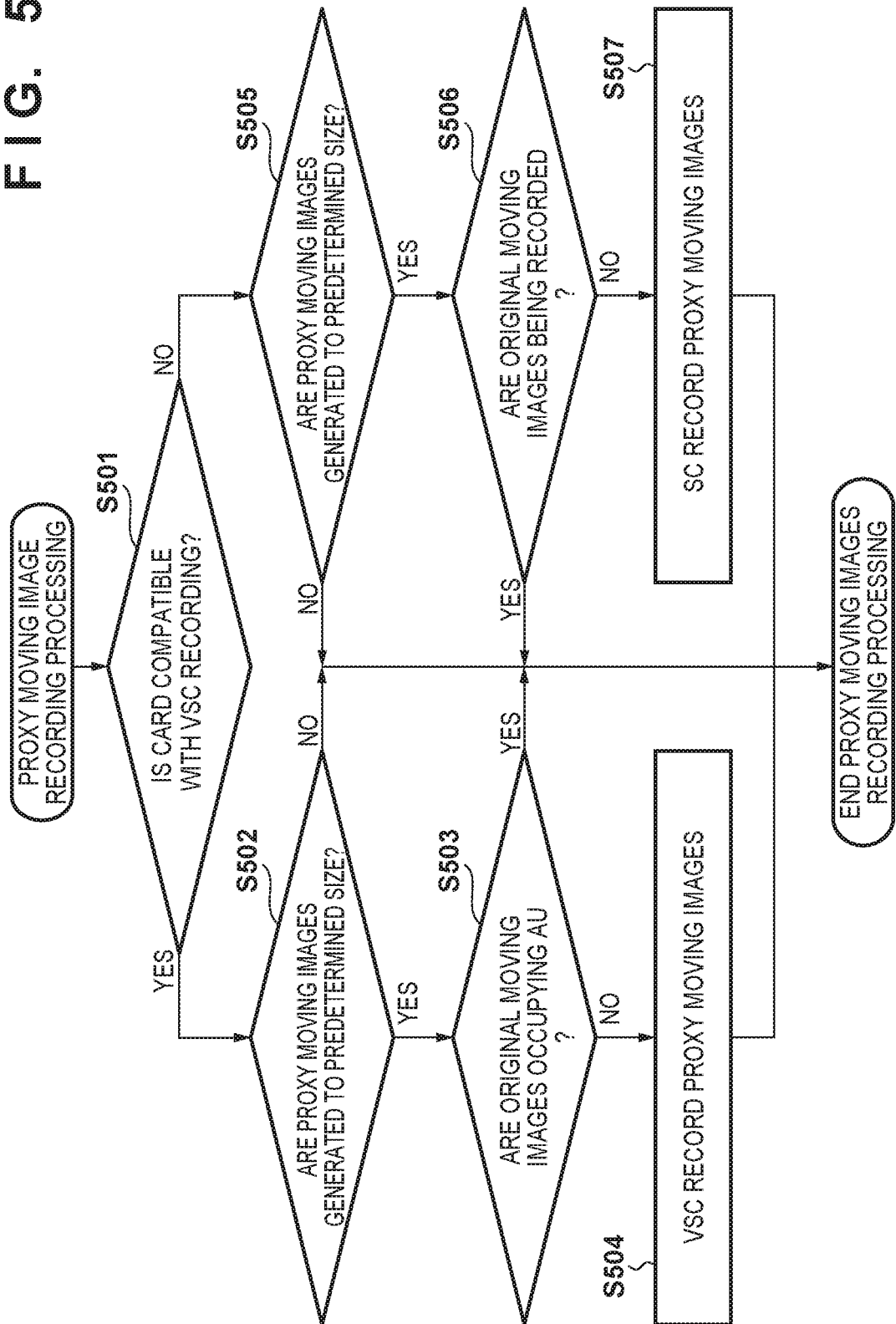

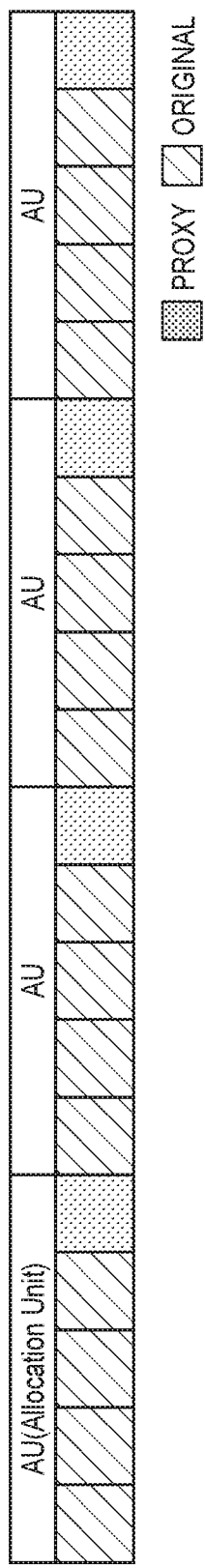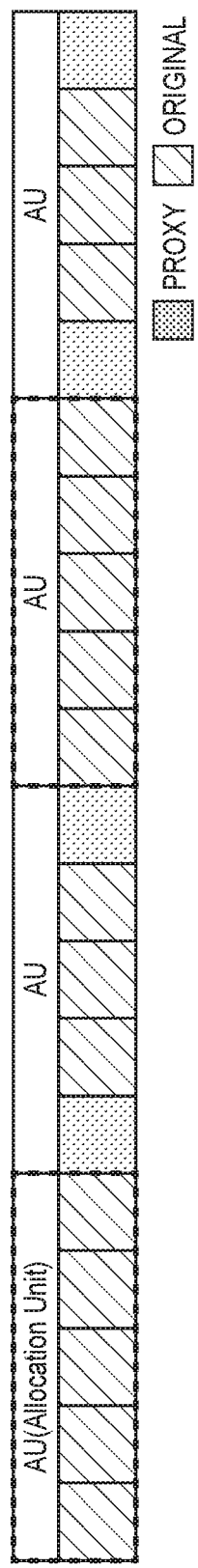

IMAGE CAPTURING APPARATUS, CONTROL METHOD THEREFOR, AND NON-TRANSITORY COMPUTER-READABLE STORAGE MEDIUM

BACKGROUND OF THE INVENTION

Field of the Invention

The present invention relates to an image capturing apparatus, a control method therefor, and a non-transitory computer-readable storage medium.

Description of the Related Art

In recent years, digital cameras and digital video cameras have become widespread, and there are increasing opportunities to shoot moving images. Furthermore, the advancements in technology have promoted the improvements in the resolution and image quality. Along with the improvements in the resolution and image quality, the bit rate of recorded moving images increases, giving rise to demand for a stable and high recording speed.

Digital cameras and digital video cameras often use a flash memory to record moving image data. For example, for an SD (Secure Digital) memory card prescribed by the SD Card Association (SDA), a standard that prescribes a speed guarantee for recording of moving images is set. See Part 1 Physical Layer Simplified Specification 6.00, Apr. 10, 2017, which is non-patent literature describing this standard.

On the other hand, advanced recording of moving images, such as double moving image recording in which two types of moving images are simultaneously recorded, and recording of still images while shooting moving images, is provided as a function of digital cameras and digital video cameras. Japanese Patent Laid-Open No. 2016-139924 describes a method for efficiently recording still images while recording moving images.

For an SD memory card, a specification called a video speed class is prescribed as a guarantee of a higher speed. In order to realize a speed guarantee based on the video speed class specification, recording is performed always based on write processing according to physical recording units called AUs (Allocation Units); in this way, a guarantee of high-speed performance is realized. This creates a restriction whereby the video speed class specification is not applicable to an AU that even partially includes recorded data.

Furthermore, the specification of the video speed class is such that a speed guarantee can be achieved also in simultaneous recording of a plurality of files. One example is recording of two types of moving images into one SD memory card while satisfying the video speed class specification (double moving image recording). With reference to FIG. 1A to FIG. 1C, a state where processing of the double moving image recording has been performed will be briefly described. Consider a case where two types of moving images A, B are sequentially recorded into an SD memory card with a usage state shown in FIG. 1A. In this case, recording is not performed with respect to an AU that is used by other data, and recording is performed consecutively with respect to AUs that are entirely composed of a blank area. As a result, the moving images A, B are recorded as shown in FIG. 1B. See FIGS. 4-57 of the non-patent literature mentioned earlier.

Now, provided that a file of the moving images B is deleted in the state of FIG. 1B, the SD memory card ends up in the state shown in FIG. 1C. Looking at the recording state of the SD memory card after the deletion of the moving images B, there is no AU that is entirely composed of a blank area. This creates a problem that, although there is a sufficient blank area into which recording can be actually performed, there is no space into which recording can be performed in accordance with the video speed class specification.

SUMMARY OF THE INVENTION

The present invention has been made in view of the aforementioned problem, and aims to provide a technique in which, when images are to be recorded in parallel as a plurality of files into a recording medium, the recording is performed so that data of the plurality of files do not coexist within one AU (Allocation Unit), or so as to reduce the rate of coexistence.

According to a first aspect of the present invention, there is provided an image capturing apparatus that has an image capturing portion and records captured image data into a recording medium, the image capturing apparatus comprising: an acquiring portion configured to acquire information indicating a standard of the recording medium from the recording medium, the standard being related to writing; and a control portion configured to, when at least two types of images are to be recorded as separate files from among images acquired from the image capturing portion, perform processing for recording into the recording medium in accordance with the information acquired by the acquiring portion and types of the two different types of images to be recorded.

According to a second aspect of the present invention, there is provided a control method for an image capturing apparatus that has an image capturing portion and records captured image data into a recording medium, the control method comprising: acquiring information indicating a standard of the recording medium from the recording medium, the standard being related to writing; and when at least two types of images are to be recorded as separate files from among images acquired from the image capturing portion, performing processing for recording into the recording medium in accordance with the information acquired by the acquiring step and types of the two different types of images to be recorded.

According to a third aspect of the present invention, there is provided a non-transitory computer-readable storage medium storing a program which, when read and executed by a computer, causes the computer to execute the steps of a control method for an image capturing apparatus that has an image capturing portion and records captured image data into a recording medium, the control method comprising: acquiring information indicating a standard of the recording medium from the recording medium, the standard being related to writing; and when at least two types of images are to be recorded as separate files from among images acquired from the image capturing portion, performing processing for recording into the recording medium in accordance with the information acquired by the acquiring step and types of the two different types of images to be recorded.

According to the present invention, when images are to be recorded in parallel as a plurality of files into a recording medium, the recording is performed so that data of the plurality of files do not coexist within one AU (Allocation Unit), or so as to reduce the rate of coexistence. As a result, when one of the files has been deleted from that recording medium, a blank AU is easily created, thus making it possible to perform recording with use of a video high-speed class or a high-speed class provided in the recording medium.

Further features of the present invention will become apparent from the following description of exemplary embodiments (with reference to the attached drawings).

BRIEF DESCRIPTION OF THE DRAWINGS

FIGS. 1A-IC are diagrams for describing a problem of processing for recording into a recording medium.

FIG. 5 is a flowchart showing proxy moving image recording processing of the first embodiment.

FIGS. 6A and 6B are diagrams showing recording states of a recording medium of the first embodiment.

DESCRIPTION OF THE EMBODIMENTS

The following describes embodiments according to the present invention in detail in accordance with the attached drawings.

First Embodiment

Figure 2:
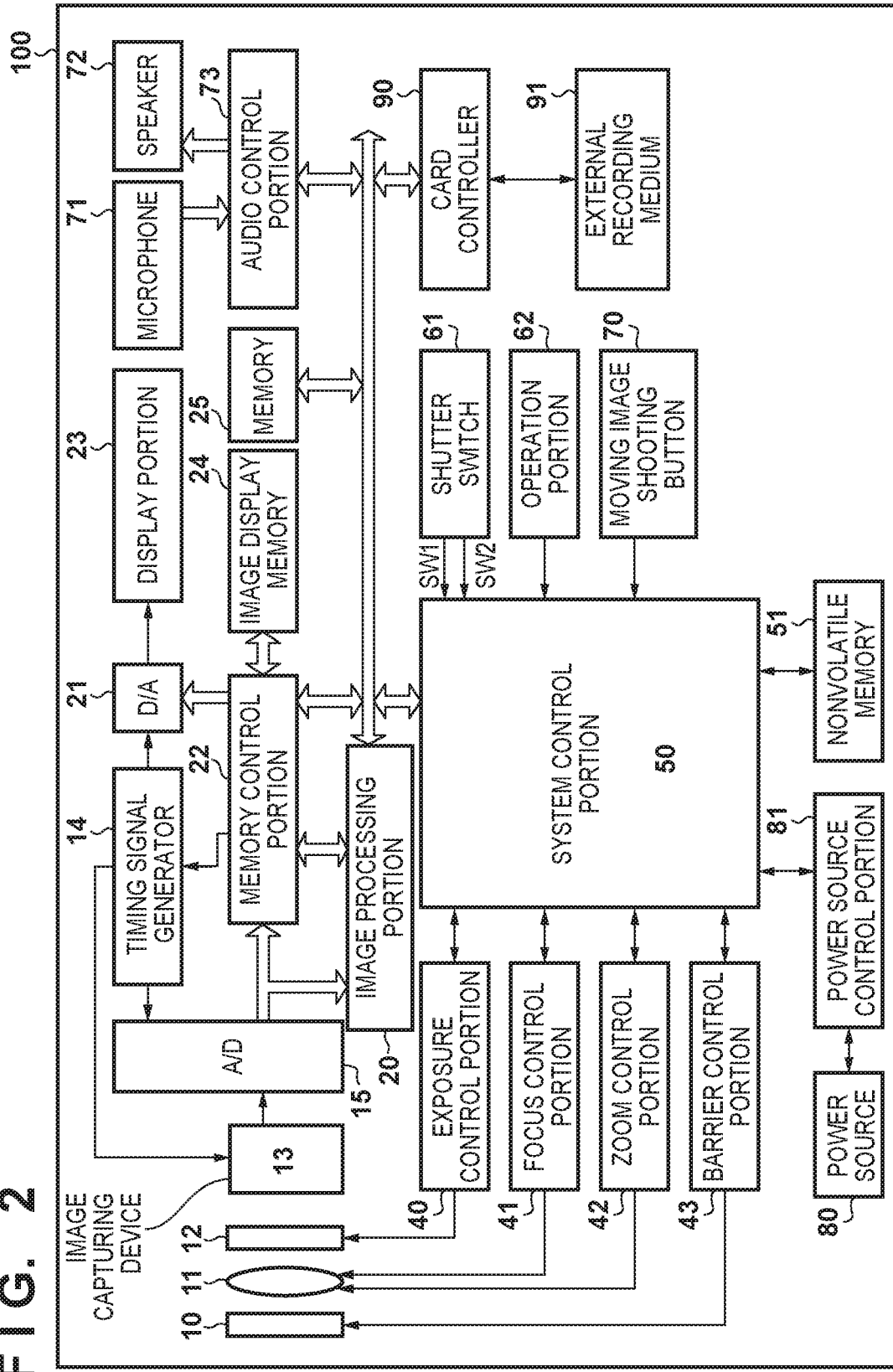
FIG. 2 is a block configuration diagram of a digital camera according to an embodiment.

FIG. 2 is a block configuration diagram of an image capturing apparatus 100 to which the present embodiment is applied. Below, each configuration and its functions will be described. Although the image capturing apparatus 100 will be described as a digital camera in the following embodiment, it is to be understood that this is merely an example because the embodiment can be applied to an apparatus that has an image capturing function and a function of recording image data acquired through image capturing into a recording medium, such as a smartphone.

The image capturing apparatus 100 includes a photographing lens 11, a shutter 12 having a diaphragm function, and an image capturing device 13 composed of, for example, a CCD or a CMOS element that converts an optical image into an electrical signal. Filters with R, G, and B color components are arranged in front of the image capturing device 13, and an analog signal corresponding to the intensity of light incident via the filters is output. It is assumed that the Bayer arrangement is used as the filter arrangement. Furthermore, a barrier 10 for protection from an external shock and for preventing a stain is provided in front of the photographing lens 11. In synchronization with a signal from a timing signal generator 14, an A/D converter 15 converts an analog signal output from the image capturing device 13 into digital image data, and supplies the digital image data to an image processing portion 20 and a memory control portion 22. Note that image data acquired by the A/D converter 15 is a collection of pieces of Bayer-arrangement pixel data that is dependent on the filter arrangement, and is referred to as RAW image data.

The memory control portion 22 generates development parameters corresponding to each RAW image data based on information at the time of shooting, and writes the development parameters into a memory 25 together with the RAW image data. The content of the development parameters is composed of various types of parameters, such as exposure settings, white balance, color space, and contrast, used in image processing for recording based on a JPEG method and the like.

Also, the image processing portion 20 applies various types of processing, such as predetermined pixel interpolation processing, de-Bayer processing (also referred to as demosaicing processing), and color conversion processing, to RAW image data from the A/D converter 15 or image data from the memory control portion 22. Furthermore, the image processing portion 20 performs predetermined computational processing, and also performs AWB (auto white balance) processing based on the acquired computation result. In addition, the image processing portion 20 reads in images stored in the memory 25, performs compression processing or decompression processing based on a JPEG method or an MPEG-4 AVC/H.264 method, and writes data that has undergone the processing into the memory 25. Moreover, in the embodiment, the image processing portion 20 has a function of generating image data that has been reduced to a preset resolution from image data of the original resolution acquired by the image capturing device 13 in accordance with an instruction from a system control portion 50. Use of this function enables recording of not only images of the original resolution of the image capturing device 13, but also images of lower resolutions.

The memory control portion 22 controls the A/D converter 15, the timing signal generator 14, the image processing portion 20, an image display memory 24, a D/A converter 21, and the memory 25.

RAW image data that has been generated via the A/D converter 15 is written into the image display memory 24 or the memory 25, either via the image processing portion 20 and the memory control portion 22, or directly via the memory control portion 22. Then, the memory control portion 22 reads out image data for display that has been written into the image display memory 24, and causes a display portion 23 to display the image data for display via the D/A converter 21. The display portion 23 functions as an electronic viewfinder, which displays a live video, by sequentially displaying image data captured by the image capturing device 13. The display portion 23 also displays various types of menus generated by a system control portion 50, which will be described later.

The memory 25 is a memory for temporarily storing still images and moving images that have been shot, and has a storage capacity that is sufficient to store a predetermined number of still images and moving images of a predetermined duration. Furthermore, the memory 25 can also be used as a work area for the system control portion 50.

An exposure control portion 40 controls opening and closing of the shutter 12 under control of the system control portion 50. A focus control portion 41 controls focusing of the photographing lens 11 under control of the system control portion 50. A zoom control portion 42 controls zooming of the photographing lens 11 under control of the system control portion 50. A barrier control portion 43 controls opening and closing of the barrier 10 under control of the system control portion 50.

The system control portion 50 controls the entirety of the digital camera by performing processing in accordance with programs stored in a nonvolatile memory 51. Note that this nonvolatile memory 51 has recorded therein not only programs, but also various types of parameters, map information, and the like.

A shutter switch 61 outputs signals SW1, SW2 in accordance with a state of depression performed by a user. In a non-depressed state, the shutter switch 61 outputs the signal SW1=SW2="0". In a half-depressed state, the shutter switch 61 outputs the signal SW1="1", the signal SW2="0". When fully depressed, the shutter switch 61 outputs the signal SW1=SW2="1". As a result, the system control portion 50 can detect a state of depression. Upon detecting the half-depressed state, the system control portion 50 issues an instruction for starting the operations of AF (autofocus) processing, AE (automatic exposure) processing, AWB (auto white balance) processing, EF (preliminary flash emission) processing, and the like. Upon detecting the fully-depressed state, the system control portion 50 performs a processing sequence, such as exposure processing for writing image data from the A/D converter 15 into the memory 25 via the memory control portion 22, development processing that uses computation in the image processing portion 20 and the memory control portion 22, processing for reading out image data from the memory 25, applying the compression processing to the image data through the image processing portion 20, and writing the image data into the memory 25, and furthermore, recording processing which is writing of encoded image data stored in the memory 25 into an external recording medium 91 via a card controller 90.

An operation portion 62 is composed of various types of switches and buttons, and a touchscreen. These include a power button, a menu button, a mode changeover switch for switching among a shooting mode, a reproduction mode, and other special shooting modes, a cross key, a set button, a macro button, a multi-screen reproduction page break button, a flash setting button, a button for switching among single shooting, continuous shooting, and a self timer, a menu transition + (plus) button, a menu transition − (minus) button, a reproduced image transition + (plus) button, a reproduced image transition − (minus) button, a shooting image quality selection button, an exposure correction button, a date/time setting button, and the like. Furthermore, these also include a button for issuing an instruction for using one, or a combination of two or more, selected from among pointing by eye-gaze detection, a sound recognition apparatus, and the like.

Based on a user operation, a moving image shooting button 70 issues an instruction for starting the shooting of moving images and an instruction for ending the same to the system control portion 50. Upon receiving the instruction for starting the shooting of moving images, the system control portion 50 performs shooting at a frame rate that has been set in advance by the image capturing device 13, applies development processing and encoding to each frame, and performs processing for storing into the external storage medium 91.

A microphone 71 imports an external sound of a subject and the like. A speaker 72 outputs an operation sound and a shutter sound of the image capturing apparatus 100, and audio during the reproduction of moving images. Under control of the system control portion 50, an audio control portion 73 controls the microphone 71 and the speaker 72, controls a recording level and a volume of audio data that is input and output, performs noise cancelling processing and audio compression processing, etc.

A power source control portion 81 controls supply of power from a power source 80. The power source 80 is a power source composed of a primary battery (e.g., an alkaline battery and a lithium battery), a secondary battery (e.g., a NiCd battery, a NiMH battery, and a Li battery), an AC adapter, and the like.

The card controller 90 exchanges data with the external recording medium 91. The external recording medium 91 is a removable/attachable memory card; in the embodiment, it is assumed to be an SD memory card compliant with the SD standard by the SD Card Association.

Next, the speed class specification and the video speed class specification according to the SD standard will be described.

The speed class specification and the video speed class specification are specifications that guarantee the minimum speed in recording data consecutively into a recording medium. For an SD memory card, units of recording into a physical recording area are managed as units called AUs (Allocation Units) having a specific fixed size. One AU is composed of a plurality of RUs (Recording Units). The RU size varies depending on the card type (SDSC, SDHC, SDXC) and the speed class type; according to the current standard, the size of one RU is a multiple of 16 KB, and is 512 KB at most. Information of the size and the like related to AUs and RUs on a per-card basis can be acquired via the card controller 90.

Note that the present embodiment is also applicable to a recording apparatus that uses a recording medium of other standards supporting writing methods that manage a recording area in different units. One example of such a recording medium is a CF card. For the CF card, VPG (Video Performance Guarantee) is set as a writing method that guarantees the minimum recording speed.

According to the "speed class specification", which is a specification that guarantees a speed for an SD memory card, the more the execution of recording into an AU that includes a high rate of blank areas in multiples of RU, the more the performance of the recording medium can be brought out. In order to bring out the highest speed, it is necessary to use an AU in which every RU is a blank area; however, as long as a speed reduction can be tolerated, an AU including an RU in which recording has already been performed may be used.

On the other hand, in write processing according to the "video speed class specification" for an SD memory card, it is necessary to declare, in advance, to the recording medium an AU that is intended to be used by issuing a command called a Set Free AU command before recording data A speed guarantee is achieved by performing recording consecutively into that AU in multiples of RU. Therefore, the existence of recorded data in this AU designated by Set Free AU, or writing of data into a position other than the designated AU, will be a violation of restrictions of the video speed class, in which case a speed guarantee is not achieved. However, adherence to these restrictions realizes a speed guarantee equal to or more than the speed class specification.

Next, a simultaneous moving image recording mode will be described before giving a description of moving image shooting processing of the system control portion 50 in which a plurality of types of moving images of the image capturing apparatus 100 of the present embodiment are simultaneously recorded.

This simultaneous moving image recording mode is set via the operation portion 62 before the user depresses the moving image shooting button 70, and includes two modes.

A first mode is a mode for recording, in addition to a file of original moving images that fully take advantage of the resolution of the image capturing device 13, another file of proxy moving images that are used as a material for simplifying the editing of the original moving images. When the image capturing device 13 has, for example, a 4K resolution, moving images that have a 4K resolution per frame are the original moving images, whereas moving images that have, for example, a 2K resolution per frame (the number of pixels is one-fourth of that of the original moving images) correspond to the proxy moving images.

It can be understood that in a case where editing processing for, for example, cutting out a scene in moving images is performed on a PC and the like, the lower the resolution (the number of pixels) of the moving images, the smaller the burden on the PC, and the better the response of the editing environment provided. In view of this, the editing work by the user is performed with respect to the proxy moving images. Then, in accordance with the result of editing that was finally determined, the PC automatically applies editing processing to the original moving images. In that sense, it is desirable that the same type of encoding be applied to both of the original moving images and the proxy moving images, and the original moving images and the proxy moving images also have the same frame rate. Note that the encoding amount per unit time (bit rate) of the proxy moving images is smaller than that of the original moving images.

A second mode is a mode for recording two types of moving images that do not satisfy the above-described conditions. This applies to, for example, a case where one type is recorded as moving images of RAW images (images according to the Bayer arrangement), and the other type is moving images of images that are composed of one luminance and two chrominances per pixel. This may also apply to a case of different frame rates.

Figure 3:
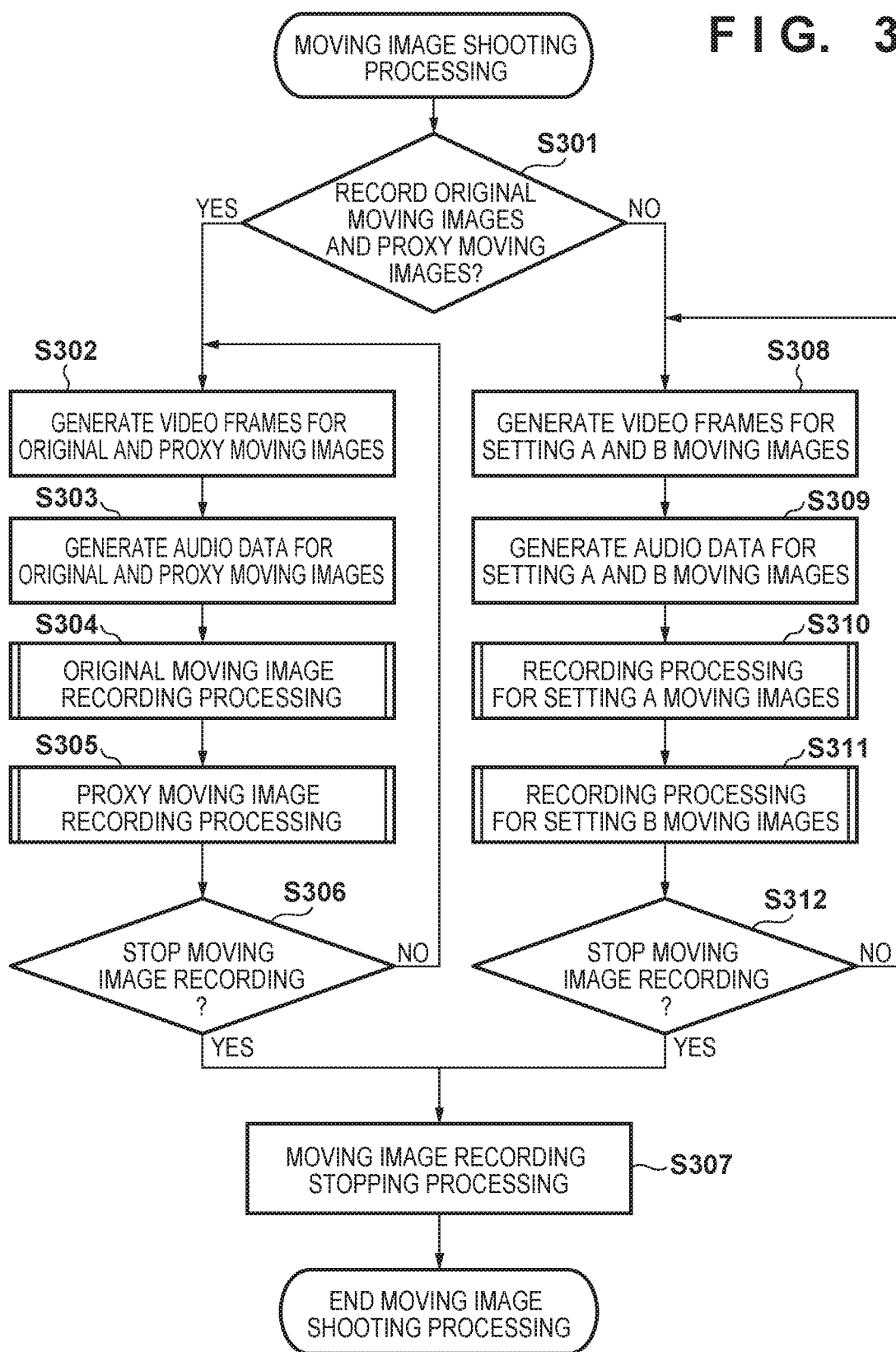
FIG. 3 is a flowchart showing moving image shooting processing of a first embodiment.

Based on the foregoing, a description is now given of processing according to simultaneous recording (parallel recording) of a plurality of types of moving images of the image capturing apparatus 100 of the present embodiment in accordance with a flowchart of FIG. 3.

First, in step S301, the system control portion 50 determines whether two types of images to be recorded are original moving images and proxy moving images. If the system control portion 50 determines that the images to be recorded are the original moving images and the proxy moving images, the processing branches off to step S302; otherwise, the processing branches off to step S308.

In step S302, the system control portion 50 generates images intended for recording of the original moving images and the proxy moving images, respectively, based on video data output from the image capturing device 13 in accordance with a recording frame rate for moving images, compresses the generated images into encoded data using video compression processing included in the image processing portion 20, and stores the encoded data into the memory 25.

In step S303, the system control portion 50 also performs audio data compression using the audio control portion 73 with respect to audio data input through the microphone 71, and stores the compressed audio data into the memory 25.

The system control portion 50 performs recording processing for the original moving images and the proxy moving images in steps S304 and S305, respectively. Then, the system control portion 50 repeats the processing of step S302 onward until it is determined that the moving image shooting button 70 is depressed again (a recording end instruction) in step S306. Then, if the recording end instruction is issued by operating the moving image shooting button 70, the system control portion 50 proceeds to step S307 and stops the recording of the moving images.

Figure 4:
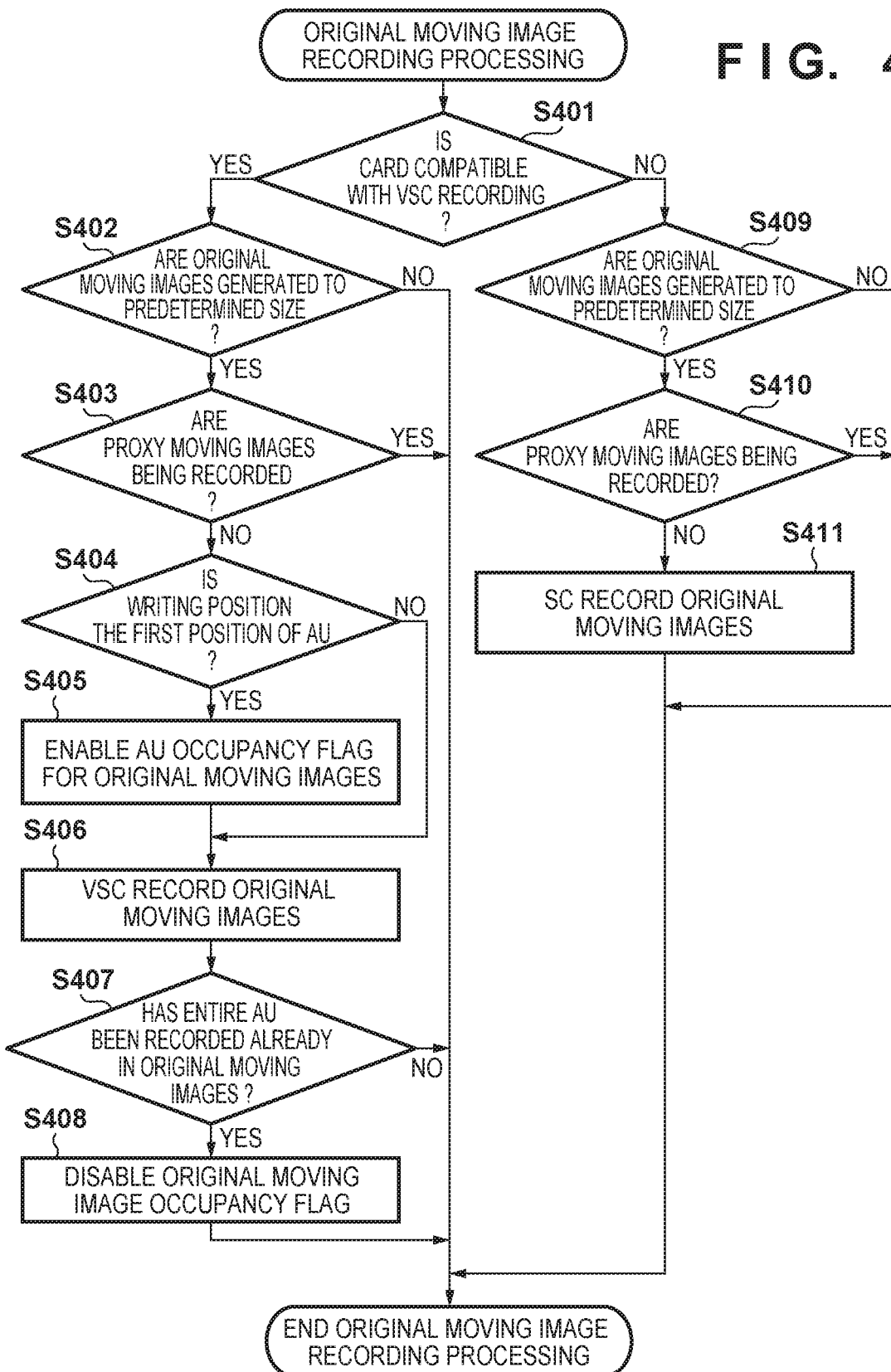
FIG. 4 is a flowchart showing original moving image recording processing of the first embodiment.

Now, a description is given of the original moving image recording processing of step S304 with reference to a flowchart of FIG. 4.

In step S401, the system control portion 50 acquires medium-related information from the external recording medium 91 via the card controller 90, and determines, based on this information, whether the external recording medium 91 is compatible with the video speed class (VSC) specification. The system control portion 50 causes the processing to branch off to step S402 if the external recording medium 91 is compatible with the video speed class specification, and to step S409 if the external recording medium 91 is not compatible with the video speed class specification (is compatible with a speed class).

In step S402, the system control portion 50 determines whether the video and audio data of the original moving images that was generated in steps S302, S303 has a predetermined size. If the generated video and audio data is smaller than the predetermined size, the present processing is ended. That is to say, accumulation of the encoded data of the original moving images into the memory 25 is continued. On the other hand, if the generated video and audio data has the predetermined size or more, the system control portion 50 proceeds to step S403.

In step S403, the system control portion 50 determines whether the video and audio data of the proxy moving images is currently being recorded into the external recording medium 91 in proxy moving image recording processing, which will be described later. If the video and audio data is currently being recorded, as the data of the original moving images cannot be recorded, a standby state becomes effective, and the present processing is ended. On the other hand, if it is determined that the proxy moving images are not currently being recorded, the system control portion 50 proceeds to step S404.

In step S404, the system control portion 50 determines whether the data to be recorded from now is to be recorded at the first position of an AU in the external recording medium 91. If it is determined that the data is to be recorded at the first position of the AU, the system control portion 50 enables an AU occupancy flag in step S405 so that only the video and audio data of the original moving images is recorded into that AU.

In step S406, the system control portion 50 actually records the video and audio data of the original moving images of a size corresponding to a multiple of an RU into the external recording medium 91 in accordance with the video speed class specification. As two types of data cannot be written into the external recording medium 91 at one moment, the original moving images are recorded after waiting for the completion of recording of the proxy moving images as described above. The same goes for recording of the proxy moving images.

In step S407, the system control portion 50 determines whether the video and audio data of the original moving images has been recorded into all RUs within one AU. If it is determined that the video and audio data of the original moving images has been recorded into all RUs, the system control portion 50 proceeds to step S408, disables the AU occupancy flag, and ends the present processing.

On the other hand, if the system control portion 50 determines that the external recording medium 91 is not compatible with the video speed class specification in step S401, the processing proceeds to step S409. In this step S409, the system control portion 50 determines whether the generated video and audio data of the original moving images has a predetermined size, and if it is determined that the generated video and audio data has the predetermined size or more, whether the video and audio data of the proxy moving images is currently being recorded is determined in step S410. If it is determined that the video and audio data of the proxy moving images is not currently being recorded, the system control portion 50 records the video and audio data of the original moving images of a size corresponding to a multiple of an RU into the external recording medium 91 in accordance with the speed class (SC) specification in step S411.

Next, a description is given of the proxy moving image recording processing of step S305 of FIG. 3 with reference to a flowchart of FIG. 5.

In step S501, the system control portion 50 reads in medium-related information from the external recording medium 91 via the card controller 90, and determines whether the external recording medium 91 is compatible with the video speed class (VSC) specification. The system control portion 50 causes the processing to branch off to step S502 if it is determined that the external recording medium 91 is compatible with the video speed class specification, and to step S505 if it is determined that the external recording medium 91 is not compatible with the same.

In step S502, the system control portion 50 determines whether the video and audio data of the proxy moving images that was generated in steps S302, S303 has a predetermined size. If the generated video and audio data is smaller than the predetermined size, the system control portion 50 ends the present processing. If the generated video and audio data has the predetermined size or more, the system control portion 50 proceeds to step S503.

In step S503, the system control portion 50 determines whether the original moving images are occupying an AU based on the value of the AU occupancy flag. If the AU occupancy flag is enabled, the system control portion 50 ends the present processing. That is to say, storing of the original moving images into an entire area of one AU is waited for.

On the other hand, if the AU occupancy flag is disabled, the system control portion 50 proceeds to step S504, and records the video and audio data of the proxy moving images of a size corresponding to a multiple of a video RU.

If the system control portion 50 determines that the external recording medium 91 is not compatible with the video speed class specification in step S501, the processing proceeds to step S505. In this step S505, the system control portion 50 determines whether the generated video and audio data of the proxy moving images has a predetermined size. If the generated video and audio data has the predetermined size or more, the system control portion 50 proceeds to step S506. In this step S506, the system control portion 50 determines whether the video and audio data of the original moving images is currently being recorded. Then, if the video and audio data of the original moving images is not currently being recorded, the system control portion 50 proceeds to step S507, and records the video and audio data of the proxy moving images of a size corresponding to a multiple of an RU into the external recording medium 91 in accordance with the speed class (SC) specification.

If the generated video and audio data of the proxy moving images does not have the predetermined size (No of step S505), or if the video and audio data of the original moving images is currently being recorded (Yes of step S506), the system control portion 50 ends the present processing.

FIG. 6A shows a pattern of data recorded in the recording medium 91 in a case where each type of moving images has been recorded in accordance with the speed class specification in the order in which the video and audio data was generated. On the other hand. FIG. 6B shows a pattern in which each type of moving images has been recorded into an external recording medium that is compatible with the video speed class specification according to the present embodiment.

As described above, in a case where the external recording medium 91 compatible with the video speed class specification is used (the case of FIG. 6B) and the original moving images have been recorded from the start of a certain AU in the external recording medium 91, only the video and audio data of the original moving images is recorded into that AU. It can be understood that the number of AUs in which only the video and audio data of the original moving images has been recorded can be increased compared to a case where recording has been performed simply in accordance with the speed class specification.

The description of FIG. 3 is now resumed. In step S301, the system control portion 50 causes the processing to branch off to step S308 in the case of multi moving image recording in which the moving images to undergo the multi moving image recording are in a relationship different from a relationship between the original moving images and the proxy moving images, and are two types of moving images that are not attached with a condition whereby, for example, they are in synchronization with each other (here, the moving images with different settings are referred to as moving images A and moving images B, respectively).

In step S308, the system control portion 50 generates images intended for recording of the moving images A and the moving images B, respectively, based on video data output from the image capturing device 13 in accordance with a recording frame rate for moving images. Then, the system control portion 50 compresses and encodes these moving images A. B using the video compression processing included in the image processing portion 20, and stores the generated encoded data into the memory 25.

In step S309, the system control portion 50 also performs audio compression using the audio control portion 73 with respect to audio data input through the microphone 71, and stores its encoded data into the memory 25. There may or may not be some difference between the bit rates of the moving images A and the moving images B (this difference is smaller than the difference between the bit rates of the original moving images and the proxy moving images described above).

Then, the system control portion 50 performs recording processing for the moving images A in step S310, and performs recording processing for the moving images B in step S311. Thereafter, the system control portion 50 repeats the processing of step S308 onward until the input of the recording end instruction through the moving image shooting button 70 is detected in step S312. Then, when the recording end instruction has been input, the system control portion 50 proceeds to step S307 and stops the recording of the moving images.

Figure 7A:
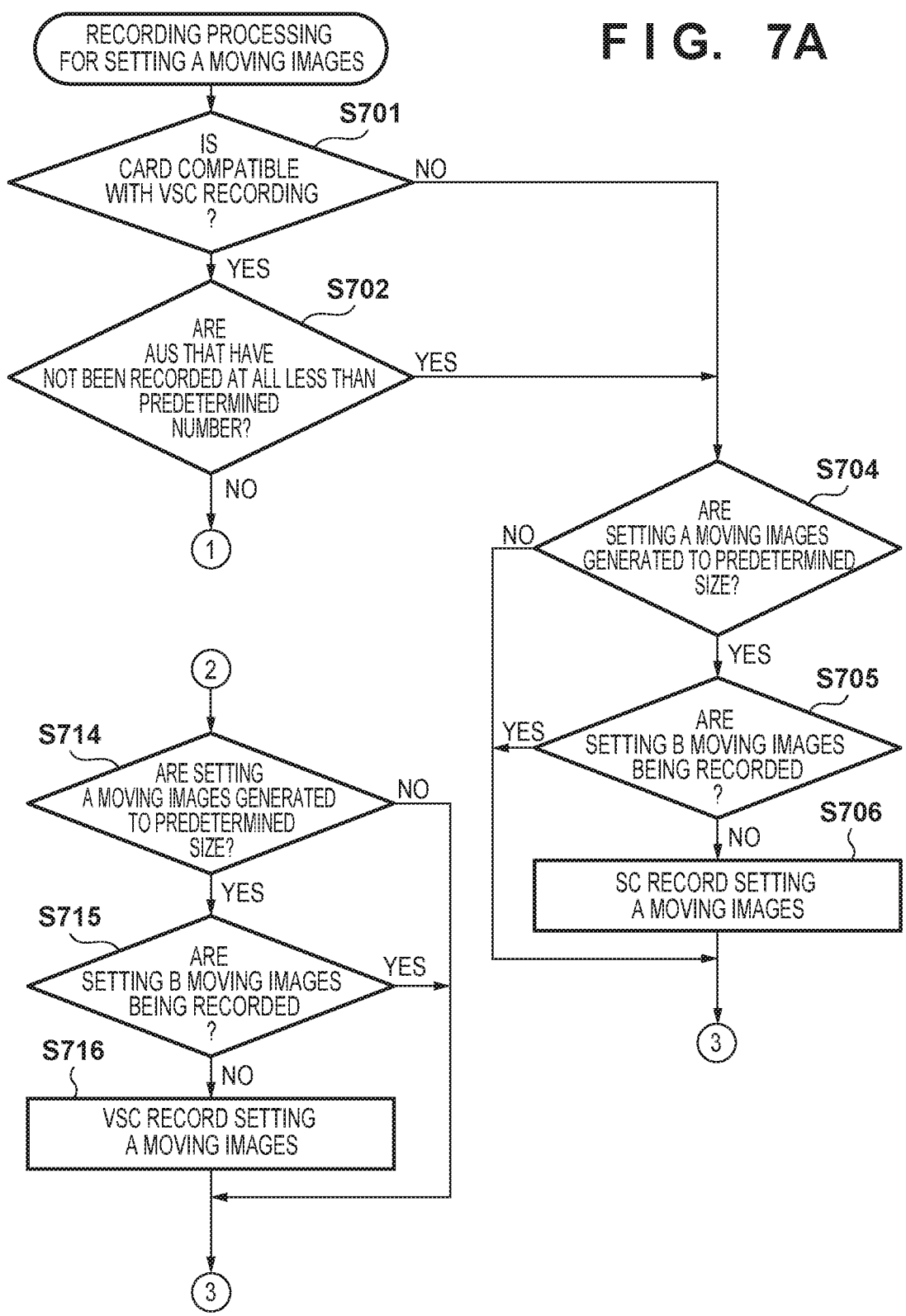
FIGS. 7A and 7B are flowcharts showing moving image recording processing of the first embodiment.
Figure 7B:
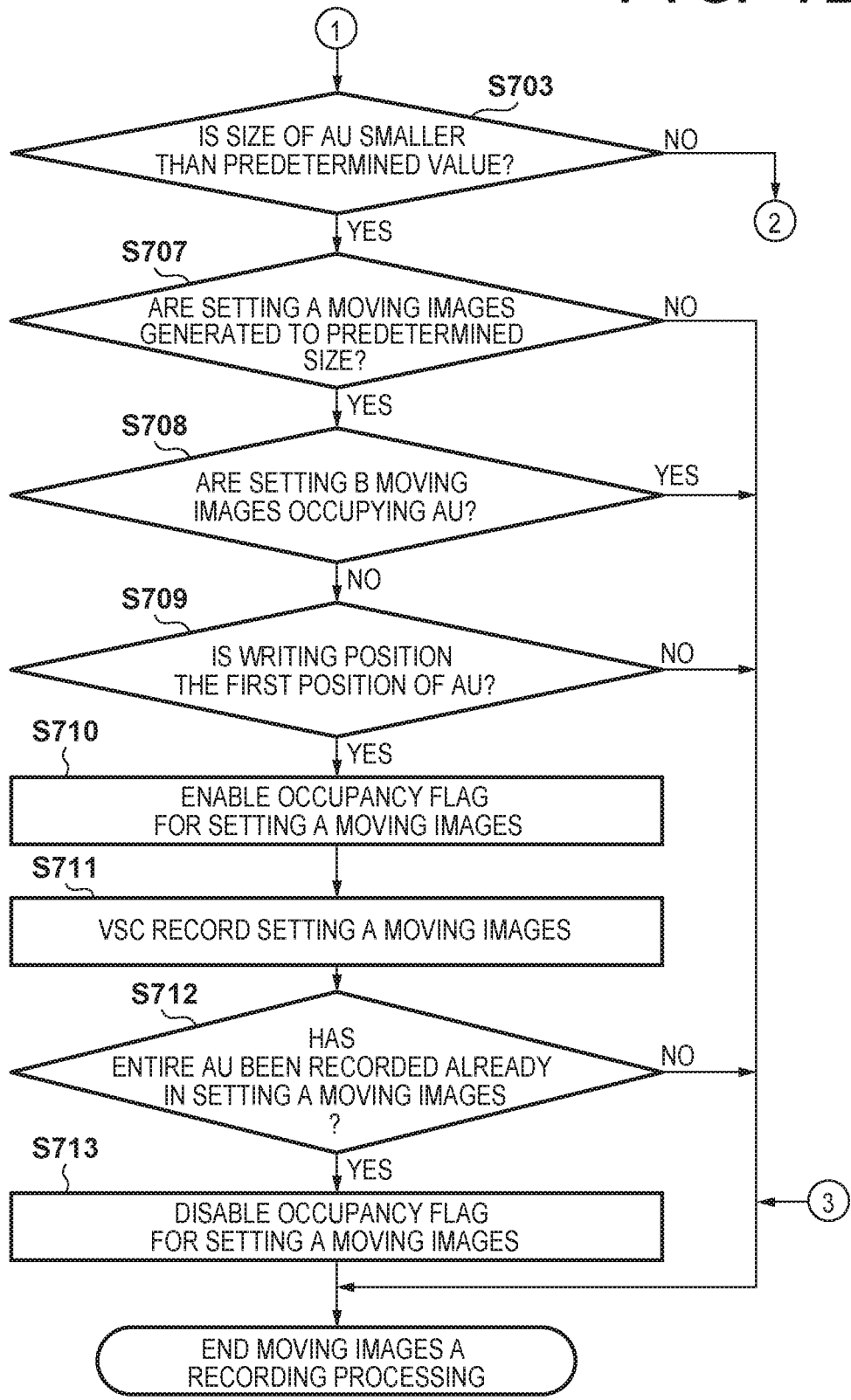

Now, the recording processing for the moving images A of step S310 will be described below with reference to flowcharts of FIGS. 7A and 7B.

In step S701, the system control portion 50 acquires control information from the external recording medium 91 via the card controller 90, and determines, based on this information, whether the external recording medium 91 is compatible with the video speed class (VSC) specification. The system control portion 50 causes the processing to branch off to step S702 if the external recording medium 91 is compatible with the video speed class (VSC) specification, and to step S704 if the external recording medium 91 is not compatible with the same.

In step S702, the system control portion 50 determines whether the number of AUs that are entirely composed of blank RUs within the external recording medium 91 is smaller than a predetermined number. The system control portion 50 causes the processing to branch off to step S704 if the number of blank AUs is smaller than the predetermined number, and to step S703 if the number of blank AUs is equal to or larger than the predetermined number.

If it is determined that the external recording medium 91 is not compatible with the video speed class in step S701, or if it is determined that the number of AUs in which nothing has been recorded is smaller than the predetermined number in step S702, the system control portion 50 proceeds to step S704.

In step S704, the system control portion 50 determines whether the generated video and audio data of the moving images A has a predetermined size. Also, in step S705, the system control portion determines whether the video and audio data of the moving images B is currently being recorded. Then, if the generated video and audio data of the moving images A has the predetermined size and the video and audio data of the moving images B is not currently being recorded, the system control portion 50 records the video and audio data of the moving images A of a size corresponding to a multiple of an RU in accordance with the speed class (SC) specification in step S706.

Furthermore, in step S703, the system control portion 50 determines whether the size of an individual AU in the external recording medium 91 is smaller than a predetermined size. It is assumed that this predetermined size can be set by the user via the operation portion 62. If the size of the AU is equal to or larger than the predetermined size, the system control portion 50 proceeds to step S714. In this step S714, the system control portion 50 determines whether the generated video and audio data of the moving images A has a predetermined size. Also, in step S715, the system control portion 50 determines whether the video and audio data of the moving images B is currently being recorded. Then, if the generated video and audio data of the moving images A has the predetermined size and the video and audio data of the moving images B is not currently being recorded, the system control portion 50 records the video and audio data of the moving images A of a size corresponding to a multiple of an RU into the external recording medium 91 in accordance with the video speed class (SC) specification in step S716.

If it is determined that the size of the AU is smaller than the predetermined size in step S703, the system control portion 50 proceeds to step S707.

In this step S707, the system control portion 50 determines whether the video and audio data of the moving images A that was generated in steps S308, S309 has a predetermined size. If the generated video and audio data is smaller than the predetermined size, the recording processing for the moving images A is ended. If the generated video and audio data has the predetermined size or more, the system control portion 50 proceeds to step S708.

In step S708, the system control portion 50 determines whether the recording processing for the moving images B, which will be described later, is occupying an AU based on whether an AU occupancy flag for the moving images B, which is used in the moving image recording processing for the moving images B, is enabled or disabled. If the AU occupancy flag for the moving images B is enabled, the system control portion 50 ends the recording processing for the moving images A. On the other hand, if the AU occupancy flag for the moving images B is disabled, the system control portion 50 proceeds to step S709.

In step S709, the system control portion 50 determines whether the data to be recorded from now is to be recorded at the first position of the AU in the external recording medium 91. If the recording position is the start of the AU, the system control portion 50 proceeds to step S710. In this step S710, the target AU is set so that only the video and audio data of the moving images A is recorded into the target AU. To this end, the system control portion 50 enables an AU occupancy flag for the moving images A. Then, in step S711, the system control portion 50 actually records the video and audio data of the moving images A of a size corresponding to a multiple of an RU into the external recording medium 91 in accordance with the video speed class specification.

In step S712, the system control portion 50 determines whether the video and audio data of the moving images A has been recorded into all RUs within the target AU. If the video and audio data of the moving images A has been recorded into all RUs within the target AU, the system control portion 50 disables the AU occupancy flag for the moving images A in step S713, and ends the present processing.

Figure 8A:
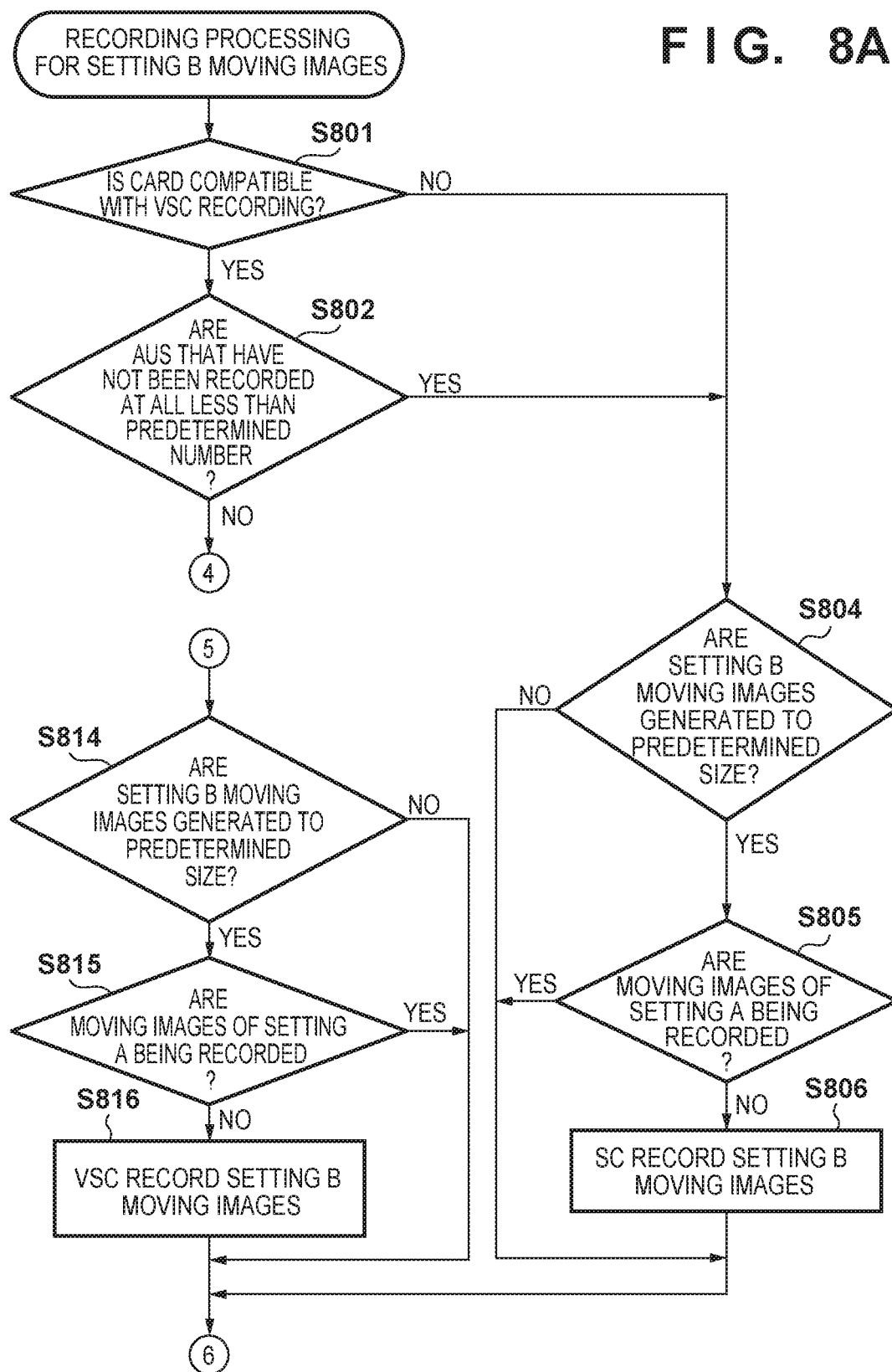
FIGS. 8A and 8B are flowcharts showing moving image recording processing of the first embodiment.
Figure 8B:
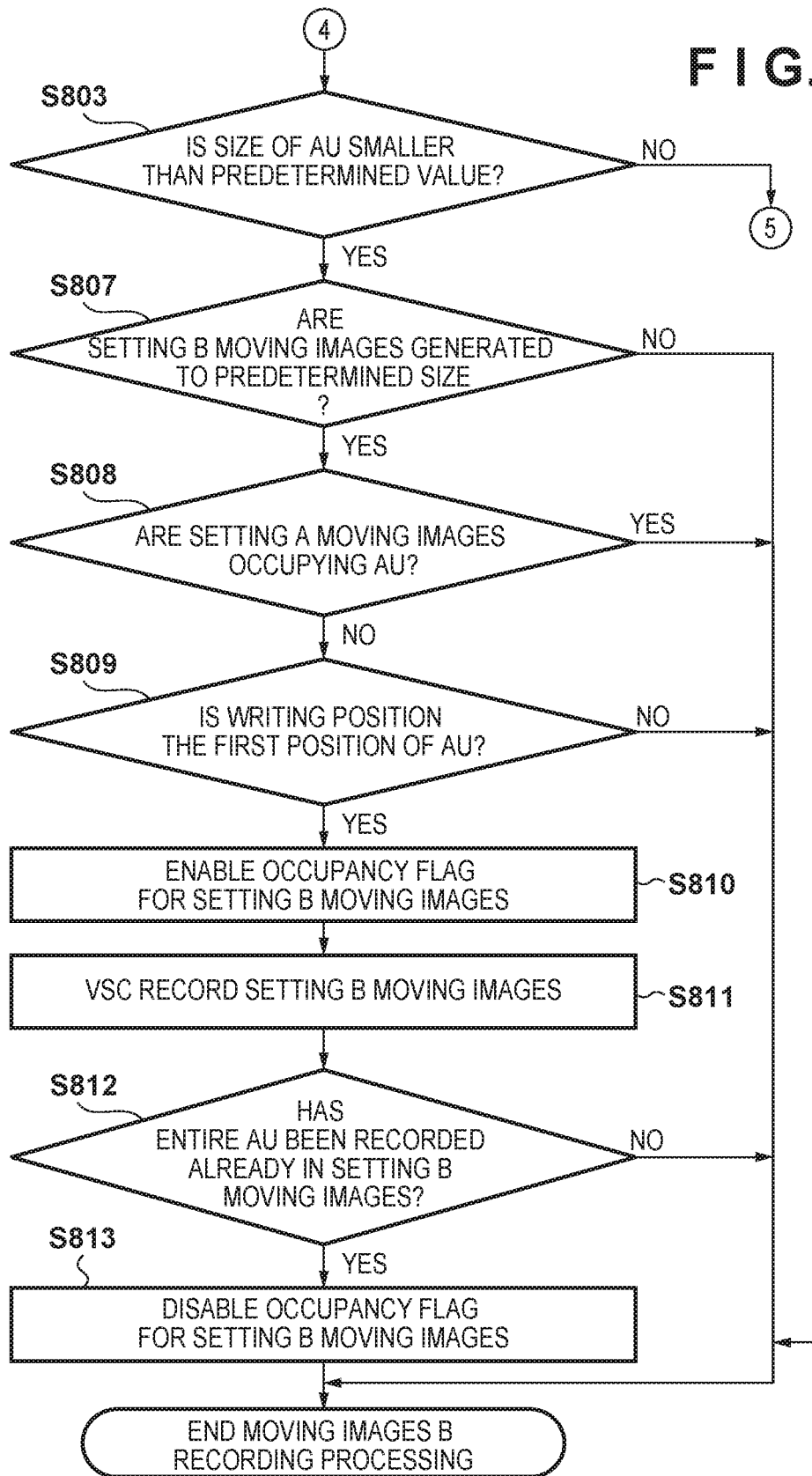

Next, a description is given of the recording processing for the moving images B in step S311 of FIG. 3 in accordance with flowcharts of FIGS. 8A and 8B. This recording processing for the moving images B is basically the same as the recording processing for the moving images A.

In step S801, the system control portion 50 reads in control information from the external recording medium 91 via the card controller 90, and determines whether the external recording medium 91 is compatible with the video speed class (VSC) specification. The system control portion 50 causes the processing to branch off to step S802 if the external recording medium 91 is compatible with the video speed class (VSC) specification, and to step S804 if the external recording medium 91 is not compatible with the same.

In step S802, the system control portion 50 determines whether the number of AUs that are entirely composed of blank RUs within the external recording medium 91 is smaller than a predetermined number. The system control portion 50 causes the processing to branch off to step S804 if the number of blank AUs is smaller than the predetermined number, and to step S803 if the number of blank AUs is equal to or larger than the predetermined number.

If it is determined that the external recording medium 91 is not compatible with the video speed class in step S801, or if it is determined that the number of AUs in which nothing has been recorded is smaller than the predetermined number in step S802, the system control portion 50 proceeds to step S804.

In step S804, the system control portion 50 determines whether the generated video and audio data of the moving images B has a predetermined size. Also, in step S805, the system control portion determines whether the video and audio data of the moving images A is currently being recorded. Then, if the generated video and audio data of the moving images B has the predetermined size and the video and audio data of the moving images A is not currently being recorded, the system control portion 50 records the video and audio data of the moving images B of a size corresponding to a multiple of an RU in accordance with the speed class (SC) specification in step S806.

Furthermore, in step S803, the system control portion 50 determines whether the size of an individual AU in the external recording medium 91 is smaller than a predetermined size. If the size of the AU is equal to or larger than the predetermined size, the system control portion 50 proceeds to step S814. In this step S814, the system control portion 50 determines whether the generated video and audio data of the moving images B has a predetermined size. Also, in step S815, the system control portion 50 determines whether the video and audio data of the moving images A is currently being recorded. Then, if the generated video and audio data of the moving images B has the predetermined size and the video and audio data of the moving images A is not currently being recorded the system control portion 50 records the video and audio data of the moving images B of a size corresponding to a multiple of an RU into the external recording medium 91 in accordance with the video speed class (SC) specification in step S816.

If it is determined that the size of the AU is smaller than the predetermined size in step S803, the system control portion 50 proceeds to step S807.

In this step S807, the system control portion 50 determines whether the video and audio data of the moving images B that was generated in steps S308, S309 has a predetermined size. If the generated video and audio data is smaller than the predetermined size, the recording processing for the moving images B is ended. If the generated video and audio data has the predetermined size or more, the system control portion 50 proceeds to step S808.

In step S808, the system control portion 50 determines whether the recording processing for the moving images A, which will be described later, is occupying an AU based on whether the AU occupancy flag for the moving images A, which is used in the moving image recording processing for the moving images A, is enabled or disabled. If the AU occupancy flag for the moving images A is enabled, the system control portion 50 ends the recording processing for the moving images B. On the other hand, if the AU occupancy flag for the moving images A is disabled, the system control portion 50 proceeds to step S809.

In step S809, the system control portion 50 determines whether the data to be recorded from now is to be recorded at the first position of the AU in the external recording medium 91. If the recording position is the start of the AU, the system control portion 50 proceeds to step S810. In this step S810, the target AU is set so that only the video and audio data of the moving images B is recorded into the target AU. To this end, the system control portion 50 enables the AU occupancy flag for the moving images B. Then, in step S811, the system control portion 50 actually records the video and audio data of the moving images B of a size corresponding to a multiple of an RU into the external recording medium 91 in accordance with the video speed class specification.

In step S812, the system control portion 50 determines whether the video and audio data of the moving images B has been recorded into all RUs within the target AU. If the video and audio data of the moving images B has been recorded into all RUs within the target AU, the system control portion 50 disables the AU occupancy flag for the moving images B in step S813, and ends the present processing.

As described above, in a case where the external recording medium 91 compatible with the video speed class specification is used and two types of moving images are recorded when the AU size is smaller than a predetermined size, only the video and audio data of one of the two types of moving images is recorded into each AU.

Figure 12:
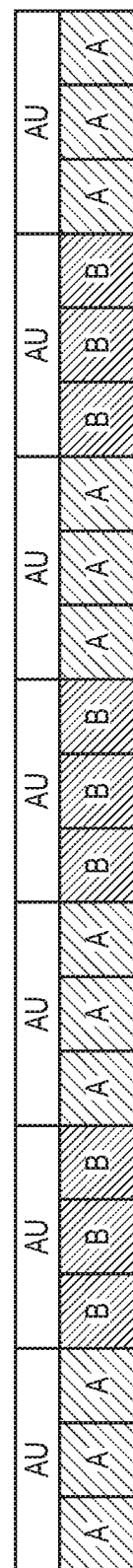
FIG. 12 is a diagram showing a recording state of a recording medium of the first embodiment.

FIG. 12 shows a pattern in which moving images have been recorded into an external recording medium compatible with the video speed class specification in the embodiment when the AU size is small. As described above, in a case where the external recording medium 91 compatible with the video speed class specification is used, control can be performed so that only one of the moving images A and the moving images B is recorded into one AU, and data of two types of moving images are not recorded in a coexistent manner into one AU.

Second Embodiment

Figure 9:
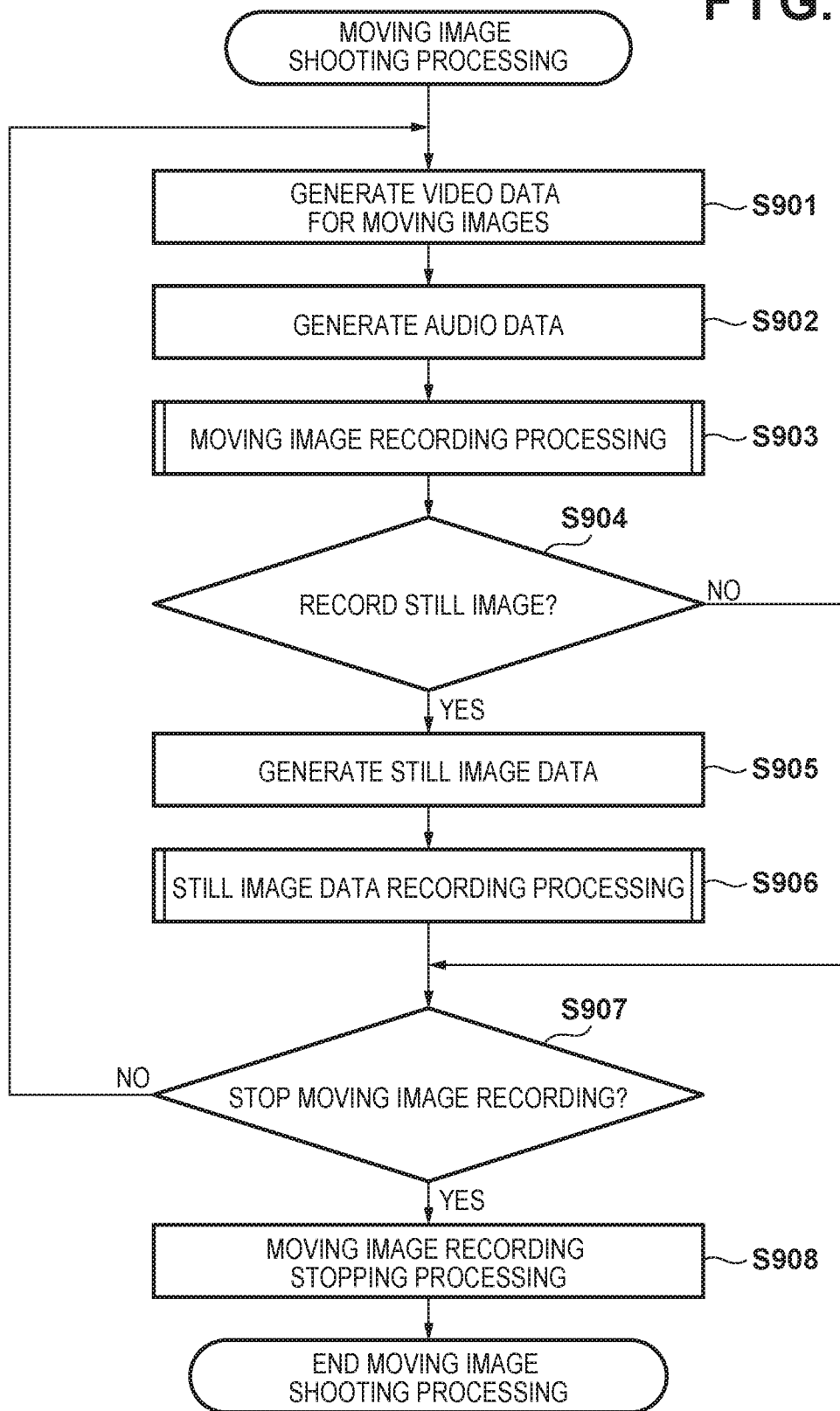
FIG. 9 is a flowchart showing moving image shooting processing of a second embodiment.

It is assumed that the configuration of the image capturing apparatus 100 according to a second embodiment is the same as that shown in FIG. 2 described in the first embodiment, and its description will be omitted. FIG. 9 is a flowchart showing still image shooting processing of the image capturing apparatus 100 of the second embodiment during the shooting of moving images. The following describes the content of the processing with reference to this diagram. This processing is started when an instruction for starting the recording of moving images has been input through the moving image shooting button 70.

In step S901, the system control portion 50 generates image data intended for recording based on video data output from the image capturing device 13 in accordance with a recording frame rate for moving images, generates encoded data using the video compression processing included in the image processing portion 20, and stores the encoded data into the memory 25.

In step S902, the system control portion 50 also generates encoded data using the audio control portion 73 with respect to audio data input through the microphone 71, and stores the encoded data into the memory 25.

In step S903, the system control portion 50 performs recording processing for the compressed and encoded video and audio data of the moving images.

Then, in step S904, the system control portion 50 determines whether the user has issued an instruction for still image shooting based on the signals SW1, SW2 from the shutter switch 61. If it is determined that the instruction for still image shooting has been issued, the system control portion 50 proceeds to step S905.

In step S905, the system control portion 50 generates still image data. The still image data is acquired by actuating the image capturing device 13 separately from video data and moving image data that have been output from the image capturing device 13 for the moving images. The system control portion 50 compresses and encodes the acquired still image data based on a JPEG method using the image processing portion 20, and stores the encoded data into the memory 25.

In step S906, the system control portion 50 performs processing for recording the encoded still image data that has been acquired into the external recording medium 91.

In step S907, the system control portion 50 determines whether an instruction for stopping the recording of the moving images has been issued by depressing the moving image shooting button 70 again. If it is determined that the instruction has not been issued, the system control portion 50 returns to step S901. On the other hand, if it is determined that the instruction for stopping the recording of the moving images has been issued, the system control portion 50 proceeds from step S907 to step S908. In this step S908, the system control portion 50 performs processing for stopping the recording of the moving images (processing for closing a moving image file).

Figure 10:
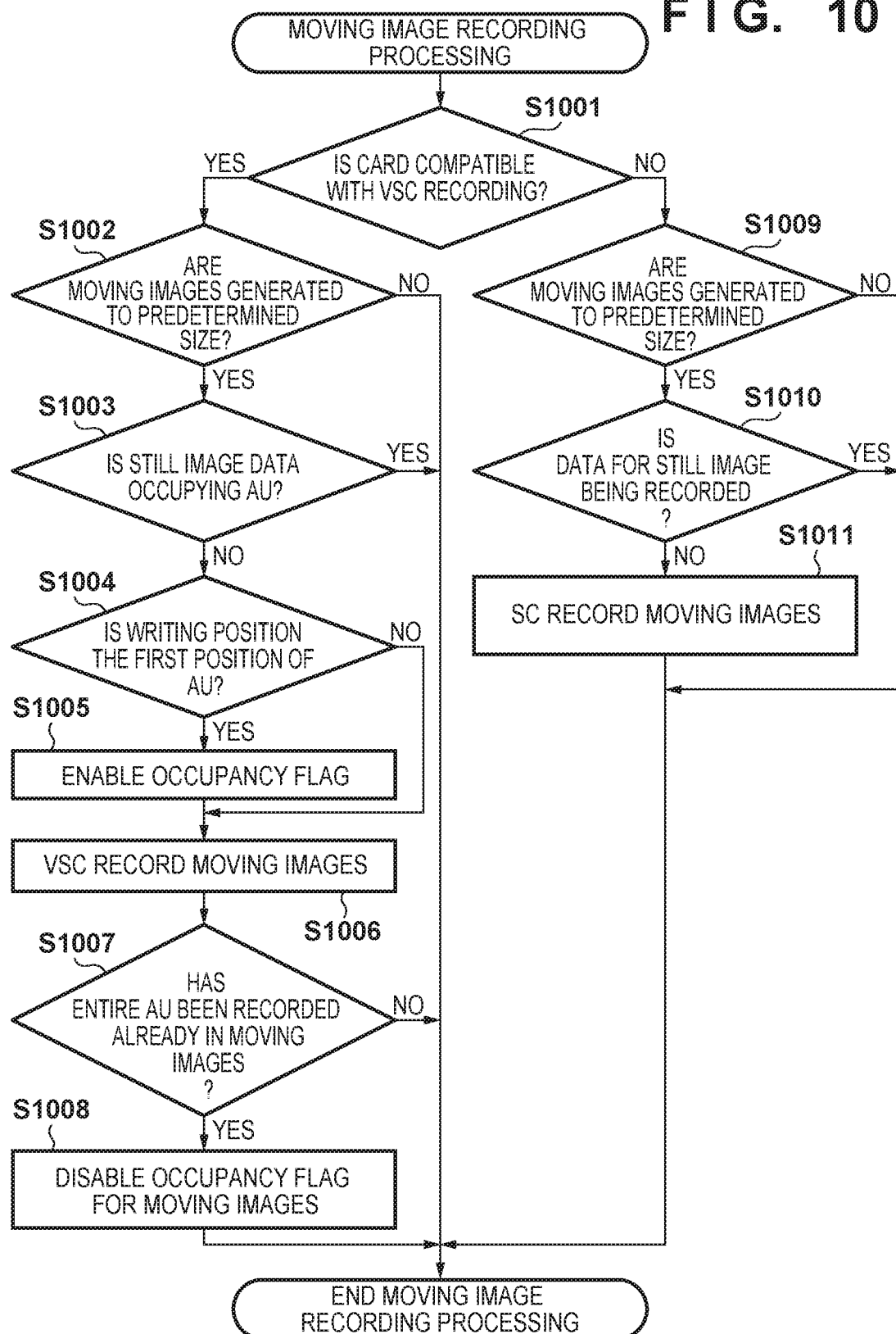
FIG. 10 is a flowchart showing moving image recording processing of the second embodiment.

Next, the details of the moving image recording processing of step S903 will be described below with reference to a flowchart of FIG. 10.

In step S1001, the system control portion 50 determines whether the external recording medium 91 is compatible with the video speed class (VSC) specification via the card controller 90. The system control portion 50 performs processing of steps S1002 to S1008 if the external recording medium 91 is compatible with the video speed class, and performs processing of steps S1009 to S1011 if the external recording medium 91 is not compatible with the same.

If the processing has proceeded to step S1009, the system control portion 50 determines whether the generated video and audio data of the moving images has a predetermined size. Also, in step S1010, the system control portion 50 determines whether still image data is currently being recorded into the external recording medium 91. If the generated video and audio data of the moving images has the predetermined size and the still image data is not currently being recorded into the external recording medium 91, the system control portion 50 records the video and audio data of the moving images of a size corresponding to a multiple of an RU into the external recording medium 91 in accordance with the speed class (SC) specification in step S1011.

In step S1002, the system control portion 50 determines whether the video and audio data of the moving images that was generated in steps S901, S902 has a predetermined size. If the generated video and audio data is smaller than the predetermined size, the present processing is ended. On the other hand, if the generated video and audio data has the predetermined size or more, the system control portion 50 proceeds to step S1003.

In step S1003, the system control portion 50 determines whether recording processing for the still image data, which will be described later, is occupying an AU based on the value of an AU occupancy flag for still images. If the AU occupancy flag for still images is enabled, the present processing is ended. On the other hand, if the AU occupancy flag for still images is disabled, the system control portion 50 proceeds to step S1004.

In step S1004, the system control portion 50 determines whether the data to be recorded is to be recorded at the first position of an AU in the external recording medium 91. If the data is to be recorded at the first position of the AU, only the video and audio data of the moving images is to be recorded into this target AU. To this end, the system control portion 50 enables an AU occupancy flag for moving images in step S1005.

In step S1006, the video and audio data of the moving images of a size corresponding to a multiple of an RU is actually recorded into the external recording medium 91 in accordance with the video speed class specification.

In step S1007, the system control portion 50 determines whether only the video and audio data of the moving images has been recorded into all RUs in the target AU. If the video and audio data of the moving images has been recorded into all RUs, the system control portion 50 proceeds to step S1008, disables the AU occupancy flag for moving images, and ends the present processing.

Figure 11:
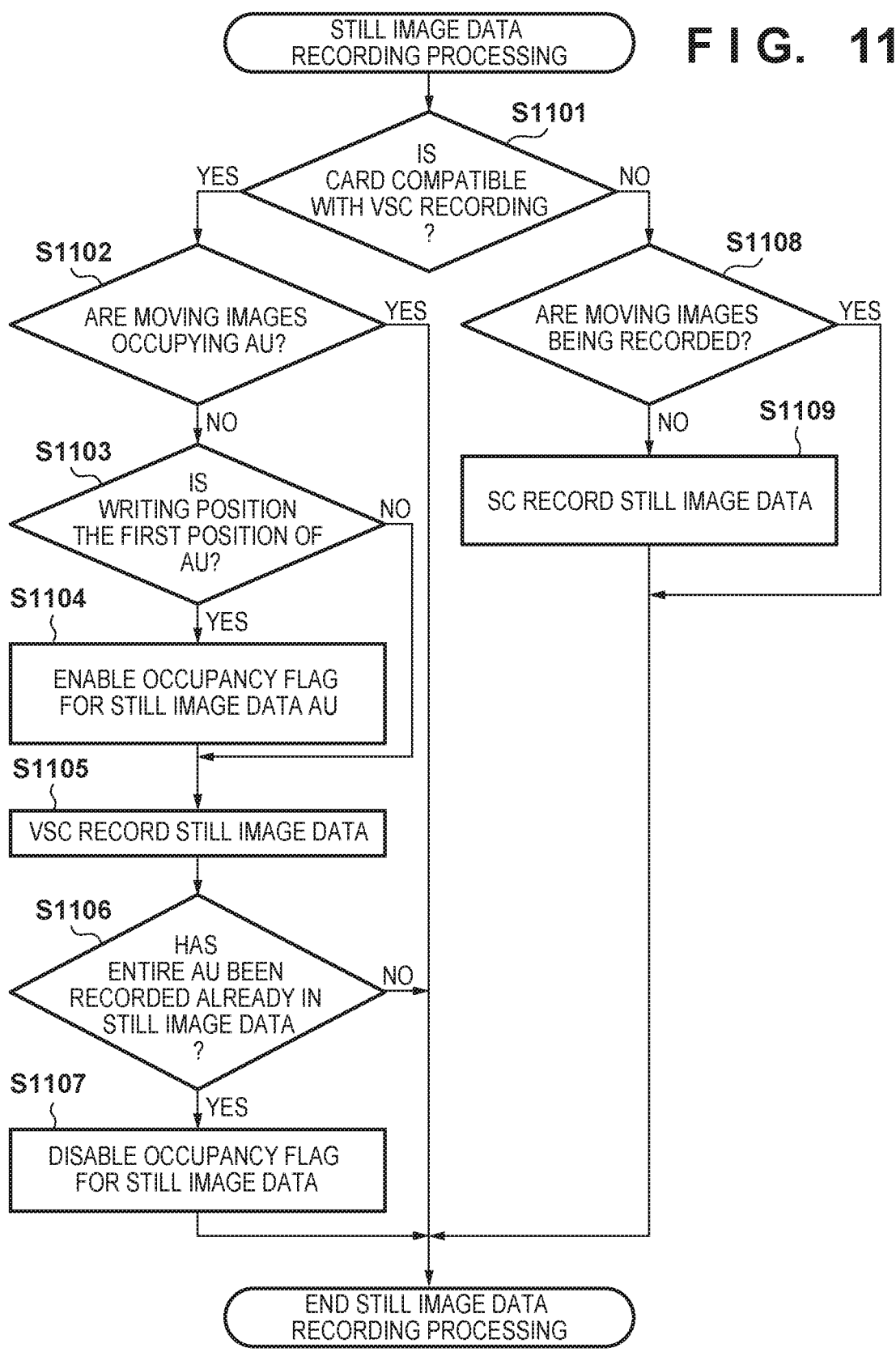
FIG. 11 is a flowchart showing still image recording processing of the second embodiment.

Next, the still image recording processing in step S906 of FIG. 9 will be described with reference to a flowchart of FIG. 11.

In step S1101, the system control portion 50 reads in control information from the external recording medium 91 via the card controller 90, and determines, based on this information, whether the external recording medium 91 is compatible with the video speed class (VSC) specification. Then, the system control portion 50 causes the processing to branch off to step S1102 if it is determined that the external recording medium 91 is compatible with the video speed class (VSC) specification, and to step S1108 if the external recording medium 91 is not compatible with the same.

In step S1108, the system control portion 50 determines whether moving image data is currently being recorded into the recording medium 91, and ends the processing if the moving image data is currently being recorded. On the other hand, if the moving image data is not currently being recorded, the system control portion 50 records still image data of a size corresponding to a multiple of an RU into the external recording medium 91 in accordance with the speed class (SC) specification in step S1109.

Regarding a write size for still image data, still image data corresponding to one file may be recorded when a memory area that holds the video and audio data of the moving images is large. In this case, recording is performed based on a size corresponding to a multiple of an RU exceeding a size of one file, and the file size is reduced later. If a memory area is limited in space, recording is performed based on a division by a size corresponding to a multiple of an RU serving as a predetermined unit.

In step S1102, the system control portion 50 determines whether the moving image recording processing is occupying an AU based on the value of the AU occupancy flag for moving images. If the value of the AU occupancy flag for moving images indicates an enabled state, it means that the AU is occupied. Therefore, in this case, the system control portion 50 ends the present processing.

On the other hand, if the AU occupancy flag for moving images is disabled, the system control portion 50 proceeds to step S1103. In this step S1103, the system control portion 50 determines whether still image data to be recorded from now is to be recorded at the first position of the AU in the external recording medium 91. If the still image data is to be recorded at the first position of the AU, the target AU is set so that only the still image data is recorded into the target AU. To this end, the system control portion 50 enables the AU occupancy flag for still images in step S1104.

In step S1105, the system control portion 50 actually records the still image data of a size corresponding to a multiple of an RU into the external recording medium 91 in accordance with the video speed class specification.

In step S1106, the system control portion 50 determines whether the still image data has been recorded into the entirety of one AU. If it is determined that the still image data has been recorded into the entirety of one AU, the system control portion 50 disables the AU occupancy flag for still images in step S1107, and ends the present processing.

The foregoing makes it possible to facilitate storing of only one type of image(s), namely a still image or moving images, into an AU when the still image can be recorded during the recording of the moving images and an external storage medium is compatible with the video speed class (VSC) specification.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-208365, filed Nov. 5, 2018, which is hereby incorporated by reference herein in its entirety.

What is claimed is:

1. An image capturing apparatus that has an image capturing portion and records captured image data into a recording medium, the image capturing apparatus comprising:
   a memory storing a program; and
   a processor which executes the program, wherein the processor functions as:
   an acquiring portion configured to acquire information indicating a standard of the recording medium from the recording medium, the standard being related to writing; and
   a control portion configured to, when at least two types of images are to be recorded as separate files from among images acquired from the image capturing portion, perform processing for recording into the recording medium in accordance with the information acquired by the acquiring portion and types of the two different types of images to be recorded,
   wherein, when the information acquired by the acquiring portion indicates that the recording medium is compatible with a video speed class and a plurality of image files are to be simultaneously recorded into the recording medium in accordance with the video speed class, the control portion performs control to record the plurality of image files so as to reduce the number of AUs (Allocation Units) in which data of different image files coexist.

2. The apparatus according to claim 1, wherein when the information acquired by the acquiring portion indicates that the recording medium is compatible with a video speed class specification, one of the two types of images is original moving images having a resolution of the image capturing portion, the other of the two types of images is proxy moving images that are used as a material for simple editing of the original moving images and have a lower resolution than the original moving images, and a position at which the original moving images are to be recorded is a first position of a blank AU (Allocation Unit) included in the recording medium, the control portion records only the original moving images into the AU, and after waiting for completion of the recording into the AU, records the proxy moving images.

3. The apparatus according to claim 2, wherein when the information acquired by the acquiring portion indicates that the recording medium is compatible with a video speed class specification, one of the two types of images is the original moving images, the other of the two types of images is the proxy moving images, and a position at which the original moving images are to be recorded is not a first position of a blank AU (Allocation Unit) included in the recording medium, the control portion performs recording in such a manner that coexistence of the original moving images and the proxy moving images in the AU is permitted.

4. The apparatus according to claim 2, wherein when the information acquired by the acquiring portion indicates that the recording medium is not compatible with a video speed class specification, one of the two types of images is the original moving images, and the other of the two types of images is the proxy moving images, the control portion records the original moving images and the proxy moving images in units of RU (Recording Unit) composing the AU while permitting coexistence.

5. The apparatus according to claim 2, wherein when the information acquired by the acquiring portion indicates that the recording medium is compatible with a video speed class specification, and the two types of images are two moving images that are in a relationship different from a relationship between the original moving images and the proxy moving images, the control portion performs recording processing in which only moving images of one type are recorded into one AU, and until completion of the recording, recording of moving images of the other type stands by.

6. The apparatus according to claim 1, wherein when the information acquired by the acquiring portion indicates that the recording medium is compatible with a video speed class specification, one of the two types of images is moving images, the other of the two types of images is a still image, and a position at which the moving images are to be recorded is a first position of a blank AU (Allocation Unit) included in the recording medium, the control portion records only the moving images into the AU, and after waiting for completion of the recording into the AU, records the still image.

7. A control method for an image capturing apparatus that has an image capturing portion and records captured image data into a recording medium, the control method comprising:

acquiring information indicating a standard of the recording medium from the recording medium, the standard being related to writing; and when at least two types of images are to be recorded as separate files from among images acquired from the image capturing portion, performing processing for recording into the recording medium in accordance with the information acquired by the acquiring step and types of the two different types of images to be recorded, wherein, when the information acquired in the acquiring indicates that the recording medium is compatible with a video speed class and a plurality of image files are to be simultaneously recorded into the recording medium in accordance with the video speed class, the performing preforms control to record the plurality of image files so as to reduce the number of AUs (Allocation Units) in which data of different image files coexist.

8. A non-transitory computer-readable storage medium storing a program which, when read and executed by a computer, causes the computer to execute the steps of a control method for an image capturing apparatus that has an image capturing portion and records captured image data into a recording medium, the control method comprising:

acquiring information indicating a standard of the recording medium from the recording medium, the standard being related to writing; and when at least two types of images are to be recorded as separate files from among images acquired from the image capturing portion, performing processing for recording into the recording medium in accordance with the information acquired by the acquiring step and types of the two different types of images to be recorded, wherein, when the information acquired in the acquiring indicates that the recording medium is compatible with a video speed class and a plurality of image files are to be simultaneously recorded into the recording medium in accordance with the video speed class, the performing preforms control to record the plurality of image files so as to reduce the number of AUs (Allocation Units) in which data of different image files coexist.

* * * * *